(12) United States Patent
Almehio

(10) Patent No.: US 12,036,915 B2
(45) Date of Patent: Jul. 16, 2024

(54) METHOD FOR MANAGING IMAGE DATA AND AUTOMOTIVE LIGHTING DEVICE

(71) Applicant: VALEO VISION, Bobigny (FR)

(72) Inventor: Yasser Almehio, Bobigny (FR)

(73) Assignee: Valeo Vision, Bobigny (FR)

( * ) Notice: Subject to any disclaimer, the term of this patent is extended or adjusted under 35 U.S.C. 154(b) by 87 days.

(21) Appl. No.: 17/770,169

(22) PCT Filed: Oct. 26, 2020

(86) PCT No.: PCT/EP2020/080085
§ 371 (c)(1),
(2) Date: Apr. 19, 2022

(87) PCT Pub. No.: WO2021/079007
PCT Pub. Date: Apr. 29, 2021

(65) Prior Publication Data
US 2022/0388443 A1     Dec. 8, 2022

(30) Foreign Application Priority Data

Oct. 25, 2019   (FR) ........................................ 1911966

(51) Int. Cl.
*B60Q 1/14*     (2006.01)
*H05B 45/12*   (2020.01)

(52) U.S. Cl.
CPC ............. *B60Q 1/143* (2013.01); *H05B 45/12* (2020.01)

(58) Field of Classification Search
CPC ................................ B60Q 1/143; H05B 45/12
See application file for complete search history.

(56) References Cited

U.S. PATENT DOCUMENTS

| 6,969,183 B2 | 11/2005 | Okubo et al. |
| 9,829,858 B2 | 11/2017 | Christmas et al. |

FOREIGN PATENT DOCUMENTS

| DE | 102013016904 A1 | 7/2014 |
| DE | 102016210147 A1 | 12/2017 |
| EP | 3136730 A1 | 3/2017 |
| JP | 2004210128 A | 7/2004 |
| JP | 2011087727 A | 5/2011 |
| JP | 6284412 B2 | 2/2018 |
| JP | 2019077204 A | 5/2019 |
| WO | 2013117923 A1 | 8/2013 |

(Continued)

OTHER PUBLICATIONS

DE 102013016904 English translation (Year: 2014).*

(Continued)

*Primary Examiner* — Anne M Hines
(74) *Attorney, Agent, or Firm* — Valeo Vision

(57) ABSTRACT

The invention provides a method for managing image data in an automotive lighting device. This method includes providing a first image pattern, which is sent to a light module, and a second image pattern. A difference pattern is generated by subtracting the second image pattern from the first image pattern and this difference pattern is sent to the light module, so the light module is able to reconstruct the second image pattern from the data of the first image pattern and the difference pattern. The invention also provides an automotive lighting device configured for the method.

11 Claims, 3 Drawing Sheets

(56) References Cited

FOREIGN PATENT DOCUMENTS

| WO | 2017214648 A1 | 12/2017 |
| WO | 2020208818 A1 | 9/2021 |

OTHER PUBLICATIONS

Japanese Patent Office, Office Action of corresponding Japanese Patent Application No. 2022-523976, dated Jun. 13, 2023.
European Patent Office, International Search Report and Written Opinion of corresponding International Application No. PCT/EP2020/080085, dated Jan. 20, 2021.

* cited by examiner

METHOD FOR MANAGING IMAGE DATA AND AUTOMOTIVE LIGHTING DEVICE

CROSS-REFERENCE TO RELATED APPLICATIONS

This application is filed under 35 U.S.C. § 371 U.S. National Phase of International Application No. PCT/EP2020/080085 filed Oct. 26, 2020 (published as WO2021079007), which claims priority benefit to French application No. 1911966 filed on Oct. 25, 2019, the disclosures of which are herein incorporated by reference in their entirety.

TECHNICAL FIELD

This invention is related to the field of automotive lighting devices, and more particularly, to the management of the electronic data derived from the control of the lighting sources.

BACKGROUND OF THE INVENTION

Current lighting devices comprises an increasing number of light sources which has to be controlled, to provide adaptive lighting functionalities.

This number of light sources involves a big amount of data, which has to be managed by the control unit. The CAN protocol is often used, in some of their variants (CAN-FD is one of the most used ones) to transfer data between the PCM and the light module. However, some car manufacturers decide to limit the bandwidth of the CAN protocol, and this affects the management operations, which usually requires about 5 Mbps.

In fact, when the system deals with images in movement, the problem of saving data size is crucial, since it affects to the speed in the data transmission and therefore to the speed in images projection.

A solution for this problem is sought.

BRIEF SUMMARY OF THE INVENTION

The invention provides a solution for these problems by means of a method for managing image data according to claim 1 and an automotive lighting device according to claim 8. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for managing image data in an automotive lighting device, the method comprising the steps of
providing a first image pattern comprising a plurality of pixels, wherein each pixel is characterized by a value related to the luminous intensity of the pixel;
sending the first image pattern to a light module;
providing a second image pattern comprising a plurality of pixels, wherein each pixel is characterized by a value related to the luminous intensity of the pixel;
generate a difference pattern, which is obtained by subtracting the first image pattern minus the second image pattern; and
sending the difference pattern to the light module, so the light module is able to reconstruct the second image pattern from the data of the first image pattern and the difference pattern.

This method is aimed to manage the image data which is exchanged between a control unit and a light module. The control unit is in charge of calculating the difference pattern and may be located in any position of the automotive vehicle, not necessarily physically inside the lighting device. The lighting module is aimed to provide a light pattern, either for lighting or signaling, and is located inside the lighting device.

The main advantage of this method is the decrease in the size of the dataset to be sent to the light module, which is extremely useful in the cases of ADB (Adaptive Driving Beam) or DBL (Dynamic Bending Light), where the difference between a frame and the next frame is low. Sometimes, the requirement of compressing the images is not necessary, due to the fact that the data size is small enough to be transmitted without being compressed.

In some particular embodiments, the light pixels of the image pattern are grey scale pixels, and more particularly, the luminous intensity of each pixel is according to a scale from 0 to 255.

Light modules usually define the light pattern on a grey scale, where the luminous intensity is graded from 0 to 255. This is a way of quantifying the light pattern so that it becomes able to be converted into light data, and then transmitted and managed by the control unit of the vehicle.

In some particular embodiments, the method further comprises the step of buffering the first image in the light module.

When the first image is buffered, it is easy to prepare the next images based on the difference patterns which are being provided.

In some particular embodiments, the method further comprises the steps of
normalizing the difference pattern by adding a compensation value to at least some of the pixels of the difference pattern so that the lower value of the normalized difference pattern is equal or greater than zero;
sending the compensation value to the light module; and
recovering the difference pattern by subtracting the compensation value from the normalized difference value.

These steps are useful in the event there is a variation which involves intensity increases and decreases, such as in the case of DBL.

In some particular embodiments, the method further comprises the steps of
applying the absolute function ABS to the difference pattern, thus generated a modified difference pattern;
sending the modified difference pattern to the light module; and
after reconstructing the second image pattern from the first image pattern and the modified difference pattern, applying the absolute function ABS to the second image pattern.

These steps are useful in the event there is a variation which involves the movement of a black zone, such as in the case of ADB.

In some particular embodiments, the method further comprises the steps of
- compressing at least a portion of the difference pattern before sending it to the light module, thus creating a compressed data; and
- decompressing the compressed data by the light module.

Sometimes, there is no need of compressing the whole difference pattern, since some of the intensity values are zero. As a consequence, only the meaningful values are compressed.

In some particular embodiments, the step of compressing at least a portion of the difference pattern affects to a zone of the difference pattern smaller than the 20% of the difference pattern.

In these cases, the representative values are located in the contour of a black zone, so there is no need to compress a greater portion.

This cropping step is useful when a big portion of the image is completely dark, so that the compression stage is focused only on the portion which include representative values.

In a second inventive aspect, the invention provides a lighting device comprising
- a light module comprising a plurality of light sources; and
- a control unit to carry out the steps of a method according to the first inventive aspect.

This lighting device is able to operate with a lower bandwidth than the traditional ones.

In some particular embodiments, the light module further comprises a processor unit, the processor unit being configured to decompress the compressed data.

With a decompression stage in the proper light module, the bandwidth is narrowed until the module itself.

In some particular embodiments, both the control unit and the processor unit comprise an image buffer to keep the first image.

In some particular embodiments, the light sources are solid-state light sources, such as LEDs.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
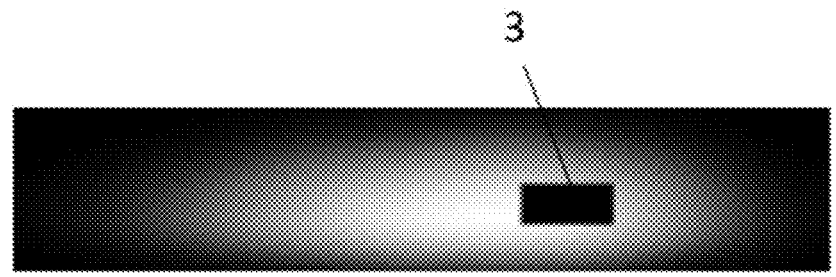
FIG. 1 shows a first image of the photometry of a high beam module which is projected by an automotive lighting device according to the invention.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a first image of the photometry of a high beam module which is to be projected by an automotive lighting device according to the invention.

This first image may be divided into pixels and each pixel may be characterized by its luminous intensity, in a scale from 0, which would correspond to black, to 255, which would correspond to white.

This image corresponds to an image of an Adaptive Driving Beam (ADB), which comprises a black zone 3 which travels through the image to keep a vehicle driving in the opposite lane out of reach of the high beam.

This first image is sent and buffered in the lighting module, so that the rest of subsequent images are reconstructed from the preceding one.

Figure 2:
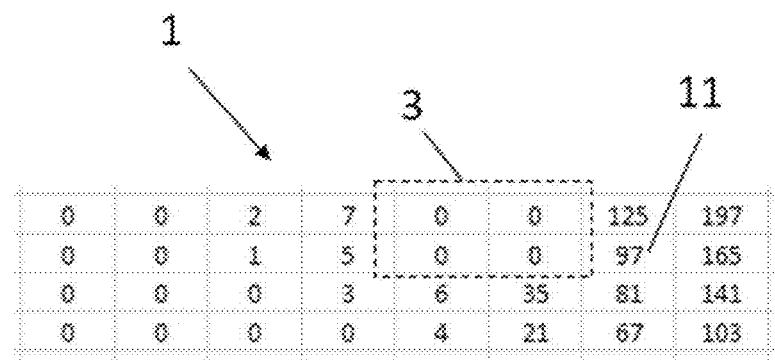
FIG. 2 shows a portion of a pixel matrix representing the photometry of FIG. 1.

FIG. 2 shows a portion of such a pixel matrix, called image pattern 1. Each pixel 11 of this image pattern 1 is characterized by a number according to the aforementioned scale.

In this example, for the sake of clarity, this black zone 3 is represented only by four pixels, which does not correspond to a realistic approach, but the correspondence with the real-life images is direct.

Figure 3:
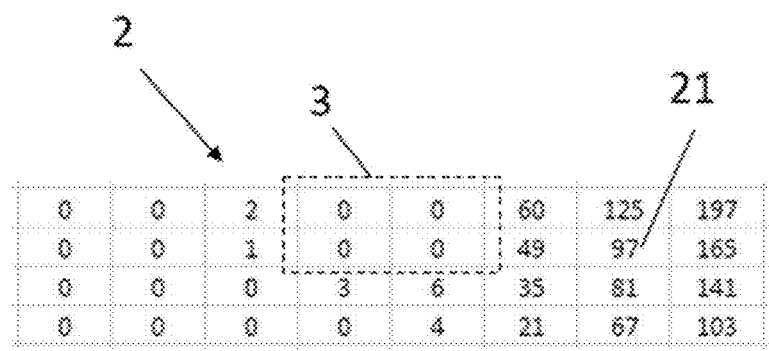
FIG. 3 shows a portion of a second pixel matrix, which corresponds to a second image of a first embodiment of a method according to the invention.

FIG. 3 shows a portion of a second pixel matrix 2, with pixels 21, which corresponds to a second image of the ADB. As may be seen in this image, the black zone 3 has travelled to the left, so the black zone now affects to different pixels, while on the right side of the black zone 3 now appear different light values, corresponding to the original light pattern.

Figures 4, 5, 6:
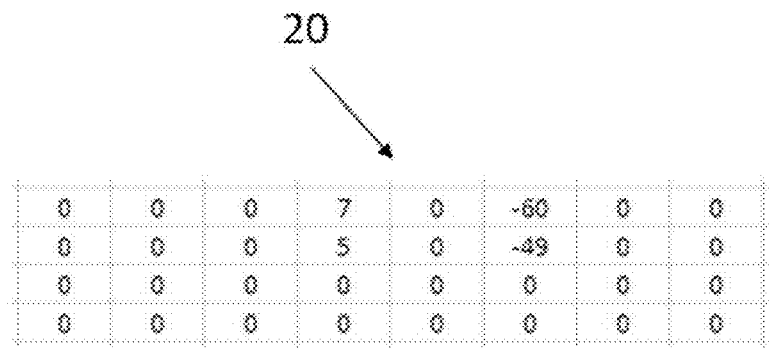
FIG. 4 shows a portion of a difference matrix, which corresponds to an intermediate image of a first embodiment of a method according to the invention.
FIG. 5 shows a portion of a provisional matrix, which corresponds to an intermediate image of a first embodiment of a method according to the invention.
FIG. 6 shows a portion of a normalized difference matrix, which corresponds to an intermediate image of a second embodiment of a method according to the invention.

FIG. 4 shows a portion of a difference matrix 20, which is the result of subtracting the second image pattern from the first image pattern. This difference matrix will have a lot of zeros, since the only difference between the first and second image patterns are the left and right boundaries of the black zone.

The next steps would be the transmission of a modified difference matrix to the light module, and the reconstruction of the second image from the buffered first image and the modified difference matrix which is transmitted.

The modified difference matrix is a matrix which is obtained by applying the ABS function to the difference matrix. With this operation, all the values of the modified difference matrix are positive, and it is easier to be transmitted.

The transmission may be in a compressed way or without compression.

FIG. 5 shows a portion of a provisional matrix, which is obtained in the light module by subtracting the modified difference matrix from the buffered first image. This provisional matrix will be almost equal to the second pattern, but with some negative values.

By the application of the ABS function to this provisional matrix, the final second image pattern is restored, so that it can be projected by the light module.

There is a second embodiment of a method according to the invention. The steps of FIG. 1 to FIG. 4 would be the same, and the difference matrix is calculated.

However, in this second embodiment, instead of applying the ABS function over the difference matrix, a compensation value is added to all the values which are different from zero in this difference matrix, obtaining a normalized difference matrix, as shown in FIG. 6. In this normalized difference matrix, all the values are greater or equal to zero, but this has been obtained by a different method than in the previous embodiment of the method.

The compensation value has been chosen by adding 1 to the ABS value of the minimum value of the original difference matrix. In this case, the minimum value was −60, the ABS value is 60 and the compensation value is 61 (not to leave a zero value in a pixel with a meaningful value).

Although this second embodiment is shown with some steps in common with the previous embodiment, this second embodiment is especially advantageous for other applications, such as Dynamic Bending Light (DBL), where the sign information is important, since there is no black zone moving along the image, but the image profile itself is moved to the left or to the right. However, for the sake of convenience, this second embodiment is explained using the ADB structure of FIG. 1 to FIG. 4.

Following with this second embodiment, the normalized difference matrix and the compensation value are sent, either compressed or uncompressed, to the light module. In the light module, the second image is restored by subtracting the compensation value from the normalized difference matrix and subtracting the difference matrix from the first image.

The final result is the same. Each embodiment is chosen depending on the light functionality.

The data transmission rate of this method is significantly lower than in other methods. In fact, the data may be transmitted either compressed or uncompressed. In any case, the data transmission rate is enough to fulfil some car manufacturers' requests, so this data may be sent to the light module compelling with restrictive conditions about the bandwidth.

Figure 7:
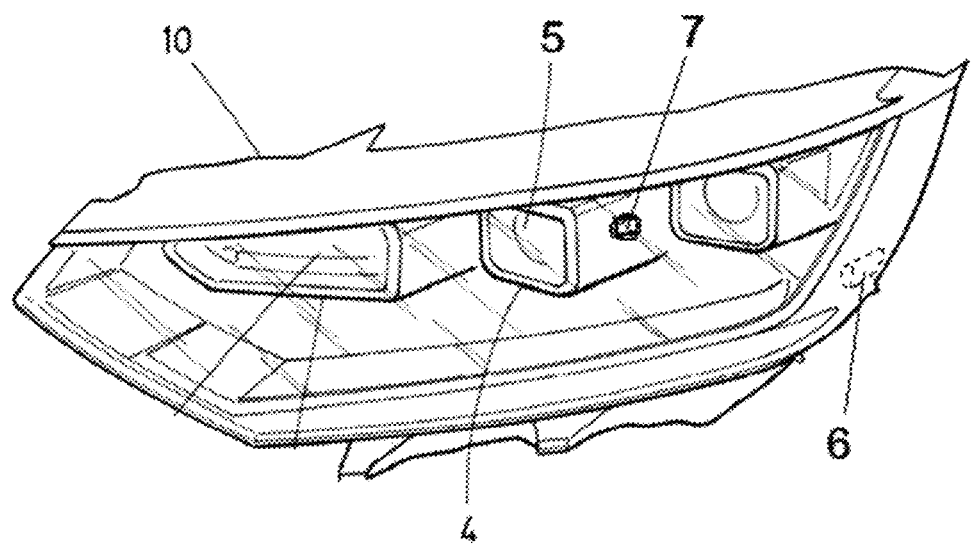
FIG. 7 shows an automotive lighting device according to the invention.

FIG. 7 shows an automotive lighting device according to the invention, this lighting device comprising:
a light module 4 comprising a plurality of LEDs 5;
a control unit 6 to carry out the compression steps described in the previous figures, generating the compressed data; and
a processor unit 7, the processor unit 7 being configured to decompress the compressed data, this processor unit being located in the light module 4.

Both the control unit 6 and the processor unit 7 comprise a buffer to store the preceding image, so that this preceding image is used in the restoration of the subsequent image.

Elements of the example embodiments are consistently denoted by the same reference numerals throughout the drawings and detailed description where appropriate:
1 First image pattern
11 Pixel of the first image pattern
2 Second image pattern
21 Pixel of the second image pattern
3 Black zone
4 Light module
5 LEDs
6 Control unit
7 Processor unit
10 Automotive lighting device
20 Difference matrix
100 Automotive vehicle

What is claimed is:
1. A method for managing image data in an automotive lighting device, comprising:
providing a first image pattern including a plurality of first pixels, wherein each of the plurality of first pixels is characterized by a value related to the luminous intensity of the pixel;
sending the first image pattern to a light module;
providing a second image pattern including a plurality of second pixels, wherein each of the plurality of second pixels is characterized by a value related to the luminous intensity of the pixel;
generate a difference pattern by subtracting the second image pattern from the first image pattern; and
sending the difference pattern to the light module, so the light module is able to reconstruct the second image pattern from the data of the first image pattern and the difference pattern.

2. The method according to claim 1, wherein each of the plurality of the first pixels of the first image pattern are greyscale pixels, and the luminous intensity of each pixel is characterized by a number according to a scale from 0 to 255.

3. The method according to claim 1, further comprising buffering the first image in the light module.

4. The method according to claim 1, further comprising:
normalizing the difference pattern, to generate a normalized difference pattern, by adding a compensation value to at least some of the pixels of the difference pattern so that the lower value of the normalized difference pattern is equal or greater than zero;
sending the compensation value to the light module; and
recovering the difference pattern by subtracting the compensation value from the normalized difference pattern.

5. The method according to claim 1, further comprising:
applying the absolute function ABS to the difference pattern to generate a modified difference pattern;
sending the modified difference pattern to the light module; and
reconstructing the second image pattern from the first image pattern, the modified difference pattern, and the absolute function ABS.

6. The method according to claim 1, further comprising:
compressing at least a portion of the difference pattern before sending it to the light module, thus creating a compressed data; and
decompressing the compressed data by the light module.

7. The method according to claim 6, wherein the at least a portion of the difference pattern is smaller than the 20% of the difference pattern.

8. An automotive lighting device, comprising:
a light module including a plurality of light sources; and
a control unit, with the control unit configured to:
provide a first image pattern including a plurality of first pixels, wherein each of the plurality of first pixels is characterized by a value related to the luminous intensity of the pixel;
send the first image pattern to a light module;
provide a second image pattern including a plurality of second pixels, wherein each of the plurality of second pixels is characterized by a value related to the luminous intensity of the pixel;
generate a difference pattern by subtracting the second image pattern from the first image pattern; and
send the difference pattern to the light module, so the light module is able to reconstruct the second image pattern from the data of the first image pattern and the difference pattern.

9. The automotive lighting device according to claim 8, wherein the light module further includes a processor unit, with the processor unit being configured to decompress compressed data.

10. The automotive lighting device according to claim 9, wherein both the control unit and the processor unit include an image buffer to keep the first image.

11. The automotive lighting device according to claim 8, wherein the light sources are solid-state light sources.

* * * * *